United States Patent
Han et al.

(10) Patent No.: US 12,332,773 B2
(45) Date of Patent: Jun. 17, 2025

(54) SYSTEM AND METHOD FOR SIMULATING LARGE CAPACITY CONFIGURATIONS IN STORAGE SYSTEMS

(71) Applicant: Dell Products L.P., Round Rock, TX (US)

(72) Inventors: Geng Han, Beijing (CN); Vamsi Vankamamidi, Hopkinton, MA (US); Yousheng Liu, Beijing (CN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/486,225

(22) Filed: Oct. 13, 2023

(65) Prior Publication Data

US 2025/0123956 A1 Apr. 17, 2025

(51) Int. Cl.
*G06F 12/02* (2006.01)
*G06F 11/34* (2006.01)

(52) U.S. Cl.
CPC ........ *G06F 12/023* (2013.01); *G06F 11/3457* (2013.01)

(58) Field of Classification Search
CPC ............................ G06F 12/023; G06F 11/3457
See application file for complete search history.

(56) References Cited

U.S. PATENT DOCUMENTS

| | | | |
|---|---|---|---|
| 7,392,360 B1* | 6/2008 | Aharoni | G06F 11/3485 711/170 |
| 10,001,929 B2* | 6/2018 | Chopra | G06F 3/067 |
| 10,452,792 B1* | 10/2019 | Flaherty | G06F 3/0653 |
| 10,671,509 B1* | 6/2020 | Thompson | G06Q 10/06315 |
| 2015/0089273 A1* | 3/2015 | Kondo | G06F 11/221 714/4.5 |
| 2022/0222113 A1* | 7/2022 | Shatsky | G06F 9/505 |

* cited by examiner

*Primary Examiner* — Mark A Giardino, Jr.
(74) *Attorney, Agent, or Firm* — Brian J. Colandreo; Heath M. Sargeant; Holland & Knight LLP (57) ABSTRACT

A method, computer program product, and computing system for generating a plurality of artificial storage devices for a storage system, wherein each artificial storage device includes a defined storage capacity. A total useable storage capacity for the storage system is defined based upon, at least in part, the defined storage capacity for each artificial storage device and a storage capacity associated with a plurality of physical storage devices. One or more input/output (IO) requests are processed on the storage system. An IO request concerning an artificial storage device of the plurality of artificial storage devices is discarded.

11 Claims, 6 Drawing Sheets

SYSTEM AND METHOD FOR SIMULATING LARGE CAPACITY CONFIGURATIONS IN STORAGE SYSTEMS

BACKGROUND

Storing and safeguarding electronic content may be beneficial in modern business and elsewhere. Accordingly, various methodologies may be employed to protect and distribute such electronic content.

For example, patterns of escalations on storage systems with large physical capacities have been observed from release to release. These issues may have been identified by conducting standard tests on large configurations during testing. Unfortunately, the lack of tests being run on larger configurations results in issues being leaked to the field.

In the storage industry, there is generally insufficient test coverage on large configurations due to significant costs. Some storage system limits depend on the total raw physical capacity of the storage system, such as the maximum number of uber objects that can be allocated and the memory budget that each component requires. Additionally, certain features are only enabled on larger configurations. However, setting up a storage system for multiple simulations with the maximum number of drives and physical capacity is costly. Furthermore, running tests on large configurations, especially tests that fill the entire system, can take a significant period of time.

SUMMARY OF DISCLOSURE

In one example implementation, a computer-implemented method executed on a computing device may include, but is not limited to, generating a plurality of artificial storage devices for a storage system, wherein each artificial storage device includes a defined storage capacity. A total useable storage capacity for the storage system is defined based upon, at least in part, the defined storage capacity for each artificial storage device and a storage capacity associated with a plurality of physical storage devices. One or more input/output (IO) requests are processed on the storage system. An IO request concerning an artificial storage device of the plurality of artificial storage devices is discarded.

One or more of the following example features may be included. Defining the total useable storage capacity for the storage system may include defining a physical layer block (PLB) as a plurality of storage capacity portions; and allocating the plurality of storage capacity portions across the plurality of physical storage devices and the plurality of artificial storage devices. Defining the total useable storage capacity for the storage system may include compressing data to a predefined ratio for storage on the PLB. Defining the total useable storage capacity for the storage system may include prefilling a storage capacity portion of the PLB allocated to a physical storage device with the compressed data without filling any storage capacity portions of the PLB allocated to the plurality of artificial storage devices. The PLB may include two megabytes of total storage capacity. Defining the total useable storage capacity for the storage system may include defining the total useable storage capacity for the storage system based upon, at least in part, a total storage capacity of the PLB including the plurality of storage capacity portions allocated across the plurality of physical storage devices and plurality of storage capacity portions allocated across the plurality of artificial storage devices. The PLB may map to eight virtual layer blocks (VLBs) and each VLB maps to 512 user data pages.

In another example implementation, a computer program product resides on a computer readable medium that has a plurality of instructions stored on it. When executed by a processor, the instructions cause the processor to perform operations that may include, but are not limited to, generating a plurality of artificial storage devices for a storage system, wherein each artificial storage device includes a defined storage capacity. A total useable storage capacity for the storage system is defined based upon, at least in part, the defined storage capacity for each artificial storage device and a storage capacity associated with a plurality of physical storage devices. One or more input/output (IO) requests are processed on the storage system. An IO request concerning an artificial storage device of the plurality of artificial storage devices is discarded.

One or more of the following example features may be included. Defining the total useable storage capacity for the storage system may include defining a physical layer block (PLB) as a plurality of storage capacity portions; and allocating the plurality of storage capacity portions across the plurality of physical storage devices and the plurality of artificial storage devices. Defining the total useable storage capacity for the storage system may include compressing data to a predefined ratio for storage on the PLB. Defining the total useable storage capacity for the storage system may include prefilling a storage capacity portion of the PLB allocated to a physical storage device with the compressed data without filling any storage capacity portions of the PLB allocated to the plurality of artificial storage devices. The PLB may include two megabytes of total storage capacity. Defining the total useable storage capacity for the storage system may include defining the total useable storage capacity for the storage system based upon, at least in part, a total storage capacity of the PLB including the plurality of storage capacity portions allocated across the plurality of physical storage devices and plurality of storage capacity portions allocated across the plurality of artificial storage devices. The PLB may map to eight virtual layer blocks (VLBs) and each VLB maps to 512 user data pages.

In another example implementation, a computing system includes at least one processor and at least one memory architecture coupled with the at least one processor, wherein the at least one processor is configured to generate a plurality of artificial storage devices for a storage system, wherein each artificial storage device includes a defined storage capacity. A total useable storage capacity for the storage system is defined based upon, at least in part, the defined storage capacity for each artificial storage device and a storage capacity associated with a plurality of physical storage devices. One or more input/output (IO) requests are processed on the storage system. An IO request concerning an artificial storage device of the plurality of artificial storage devices is discarded.

One or more of the following example features may be included. Defining the total useable storage capacity for the storage system may include defining a physical layer block (PLB) as a plurality of storage capacity portions; and allocating the plurality of storage capacity portions across the plurality of physical storage devices and the plurality of artificial storage devices. Defining the total useable storage capacity for the storage system may include compressing data to a predefined ratio for storage on the PLB. Defining the total useable storage capacity for the storage system may include prefilling a storage capacity portion of the PLB allocated to a physical storage device with the compressed data without filling any storage capacity portions of the PLB allocated to the plurality of artificial storage devices. The PLB may include two megabytes of total storage capacity. Defining the total useable storage capacity for the storage system may include defining the total useable storage capacity for the storage system based upon, at least in part, a total storage capacity of the PLB including the plurality of storage capacity portions allocated across the plurality of physical storage devices and plurality of storage capacity portions allocated across the plurality of artificial storage devices. The PLB may map to eight virtual layer blocks (VLBs) and each VLB maps to 512 user data pages.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

Figure 1:
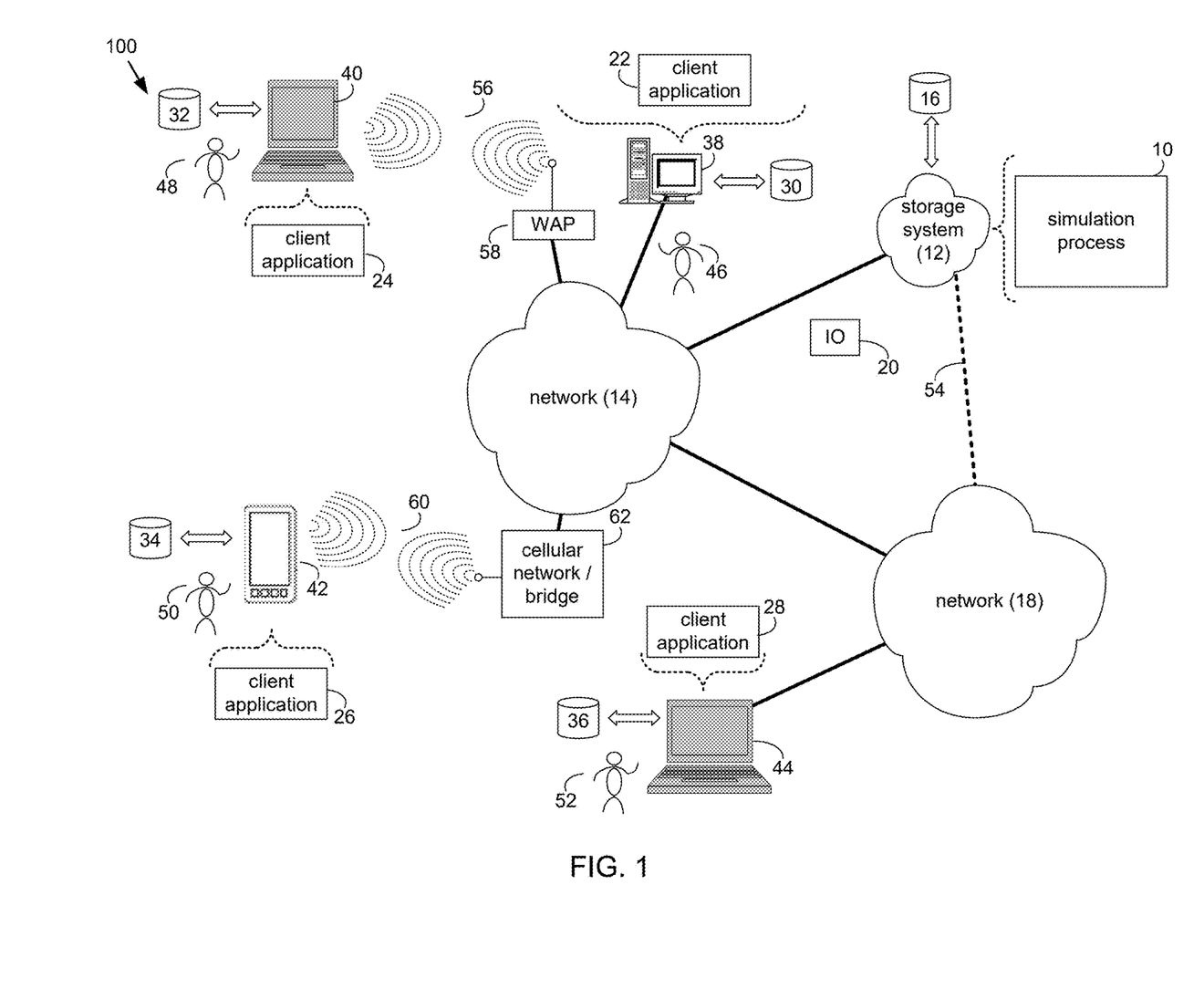
FIG. 1 is an example diagrammatic view of a storage system and a simulation process coupled to a distributed computing network according to one or more example implementations of the disclosure.

System Overview:

Referring to FIG. 1, there is shown simulation process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a minicomputer, a mainframe computer, a RAID device and a NAS system. The various components of storage system 12 may execute one or more operating systems, examples of which may include but are not limited to: Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

The instruction sets and subroutines of simulation process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random-access memory (RAM); a read-only memory (ROM); and all forms of flash memory storage devices. Additionally/alternatively, some portions of the instruction sets and subroutines of simulation process 10 may be stored on storage devices (and/or executed by processors and memory architectures) that are external to storage system 12.

Network 14 may be connected to one or more secondary networks (e.g., network 18), examples of which may include but are not limited to: a local area network; a wide area network; or an intranet, for example.

Various IO requests (e.g., IO request 20) may be sent from client applications 22, 24, 26, 28 to storage system 12. Examples of IO request 20 may include but are not limited to data write requests (e.g., a request that content be written to storage system 12) and data read requests (e.g., a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (e.g., WAP) 58, which is shown directly coupled to network 14. WAP 58 may be, for example, an IEEE 802.11a, 802.11b, 802.11 g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a simulation process, such as simulation process 10 of FIG. 1, may include but is not limited to, generating a plurality of artificial storage devices for a storage system, wherein each artificial storage device includes a defined storage capacity. A total useable storage capacity for the storage system is defined based upon, at least in part, the defined storage capacity for each artificial storage device and a storage capacity associated with a plurality of physical storage devices. One or more input/output (IO) requests are processed on the storage system. An IO request concerning an artificial storage device of the plurality of artificial storage devices is discarded.

For example purposes only, storage system 12 will be described as being a network-based storage system that includes a plurality of electro-mechanical backend storage devices. However, this is for example purposes only and is not intended to be a limitation of this disclosure, as other configurations are possible and are considered to be within the scope of this disclosure.

Figure 2:
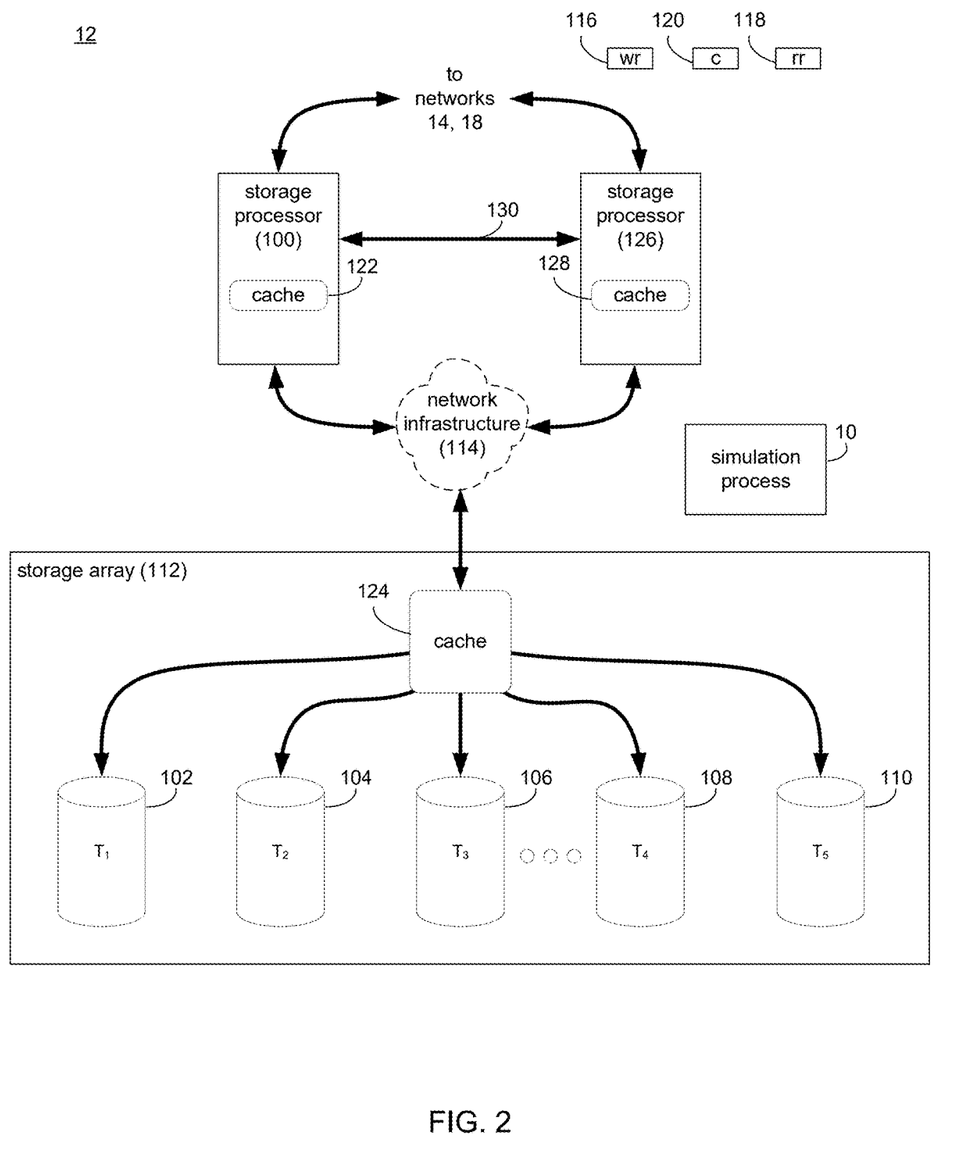
FIGS. 2-3 are example diagrammatic views of the storage system of FIG. 1 according to one or more example implementations of the disclosure.

The Storage System:

Referring also to FIG. 2, storage system 12 may include storage processor 100 and a plurality of storage targets T 1-n (e.g., storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106, 108 may be configured as a RAID 1 array, in which data is mirrored between storage targets. By mirroring data between storage targets, a level of high availability is achieved as multiple copies of the data are stored within storage system 12.

While storage targets 102, 104, 106, 108 are discussed above as being configured in a RAID 0 or RAID 1 array, this is for example purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage system 12 is shown to include four storage targets (e.g., storage targets 102, 104, 106, 108), this is for example purposes only and is not intended to be a limitation of this disclosure. Specifically, the actual number of storage targets may be increased or decreased depending upon e.g., the level of redundancy/performance/capacity required.

Storage system 12 may also include one or more coded targets 110. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 110), this is for example purposes only and is not intended to be a limitation of this disclosure. Specifically, the actual number of coded targets may be increased or decreased depending upon e.g., the level of redundancy/performance/capacity required.

Examples of storage targets 102, 104, 106, 108 and coded target 110 may include one or more electro-mechanical hard disk drives and/or solid-state/flash devices, wherein a combination of storage targets 102, 104, 106, 108 and coded target 110 and processing/control systems (not shown) may form data array 112.

The manner in which storage system 12 is implemented may vary depending upon e.g., the level of redundancy/performance/capacity required. For example, storage system 12 may be a RAID device in which storage processor 100 is a RAID controller card and storage targets 102, 104, 106, 108 and/or coded target 110 are individual "hot-swappable" hard disk drives. Another example of such a RAID device may include but is not limited to an NAS device. Alternatively, storage system 12 may be configured as a SAN, in which storage processor 100 may be e.g., a server computer and each of storage targets 102, 104, 106, 108 and/or coded target 110 may be a RAID device and/or computer-based hard disk drives. Further still, one or more of storage targets 102, 104, 106, 108 and/or coded target 110 may be a SAN.

In the event that storage system 12 is configured as a SAN, the various components of storage system 12 (e.g. storage processor 100, storage targets 102, 104, 106, 108, and coded target 110) may be coupled using network infrastructure 114, examples of which may include but are not limited to an Ethernet (e.g., Layer 2 or Layer 3) network, a fiber channel network, an InfiniBand network, or any other circuit switched/packet switched network.

Storage system 12 may execute all or a portion of simulation process 10. The instruction sets and subroutines of simulation process 10, which may be stored on a storage device (e.g., storage device 16) coupled to storage processor 100, may be executed by one or more processors (not shown) and one or more memory architectures (not shown) included within storage processor 100. Storage device 16 may include but is not limited to: a hard disk drive; a tape drive; an optical drive; a RAID device; a random-access memory (RAM); a read-only memory (ROM); and all forms of flash memory storage devices. As discussed above, some portions of the instruction sets and subroutines of simulation process 10 may be stored on storage devices (and/or executed by processors and memory architectures) that are external to storage system 12.

As discussed above, various IO requests (e.g., IO request 20) may be generated. For example, these IO requests may be sent from client applications 22, 24, 26, 28 to storage system 12. Additionally/alternatively and when storage processor 100 is configured as an application server, these IO requests may be internally generated within storage processor 100. Examples of IO request 20 may include but are not limited to data write request 116 (e.g., a request that content 118 be written to storage system 12) and data read request 120 (i.e., a request that content 118 be read from storage system 12).

During operation of storage processor 100, content 118 to be written to storage system 12 may be processed by storage processor 100. Additionally/alternatively and when storage processor 100 is configured as an application server, content 118 to be written to storage system 12 may be internally generated by storage processor 100.

Storage processor 100 may include frontend cache memory system 122. Examples of frontend cache memory system 122 may include but are not limited to a volatile, solid-state, cache memory system (e.g., a dynamic RAM cache memory system) and/or a non-volatile, solid-state, cache memory system (e.g., a flash-based, cache memory system).

Storage processor 100 may initially store content 118 within frontend cache memory system 122. Depending upon the manner in which frontend cache memory system 122 is configured, storage processor 100 may immediately write content 118 to data array 112 (if frontend cache memory system 122 is configured as a write-through cache) or may subsequently write content 118 to data array 112 (if frontend cache memory system 122 is configured as a write-back cache).

Data array 112 may include backend cache memory system 124. Examples of backend cache memory system 124 may include but are not limited to a volatile, solid-state, cache memory system (e.g., a dynamic RAM cache memory system) and/or a non-volatile, solid-state, cache memory system (e.g., a flash-based, cache memory system). During operation of data array 112, content 118 to be written to data array 112 may be received from storage processor 100. Data array 112 may initially store content 118 within backend cache memory system 124 prior to being stored on e.g., one or more of storage targets 102, 104, 106, 108, and coded target 110.

As discussed above, the instruction sets and subroutines of simulation process 10, which may be stored on storage device 16 included within storage system 12, may be executed by one or more processors (not shown) and one or more memory architectures (not shown) included within storage system 12. Accordingly, in addition to being executed on storage processor 100, some or all of the instruction sets and subroutines of simulation process 10 may be executed by one or more processors (not shown) and one or more memory architectures (not shown) included within data array 112.

Further and as discussed above, during the operation of data array 112, content (e.g., content 118) to be written to data array 112 may be received from storage processor 100 and initially stored within backend cache memory system 124 prior to being stored on e.g., one or more of storage targets 102, 104, 106, 108, 110. Accordingly, during use of data array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 110 (which would typically be slower).

In some implementations, storage system 12 may include multi-node active/active storage clusters configured to provide high availability to a user. As is known in the art, the term "high availability" may generally refer to systems or components that are durable and likely to operate continuously without failure for a long time. For example, an active/active storage cluster may be made up of at least two nodes (e.g., storage processors 100, 126), both actively running the same kind of service(s) simultaneously. One purpose of an active-active cluster may be to achieve load balancing. Load balancing may distribute workloads across all nodes in order to prevent any single node from getting overloaded. Because there are more nodes available to serve, there will also be a marked improvement in throughput and response times. Another purpose of an active-active cluster may be to provide at least one active node in the event that one of the nodes in the active-active cluster fails.

In some implementations, storage processor 126 may function like storage processor 100. For example, during operation of storage processor 126, content 118 to be written to storage system 12 may be processed by storage processor 126. Additionally/alternatively and when storage processor 126 is configured as an application server, content 118 to be written to storage system 12 may be internally generated by storage processor 126.

Storage processor 126 may include frontend cache memory system 128. Examples of frontend cache memory system 128 may include but are not limited to a volatile, solid-state, cache memory system (e.g., a dynamic RAM cache memory system) and/or a non-volatile, solid-state, cache memory system (e.g., a flash-based, cache memory system).

Storage processor 126 may initially store content 118 within frontend cache memory system 126. Depending upon the manner in which frontend cache memory system 128 is configured, storage processor 126 may immediately write content 118 to data array 112 (if frontend cache memory system 128 is configured as a write-through cache) or may subsequently write content 118 to data array 112 (if frontend cache memory system 128 is configured as a write-back cache).

In some implementations, the instruction sets and subroutines of simulation process 10, which may be stored on storage device 16 included within storage system 12, may be executed by one or more processors (not shown) and one or more memory architectures (not shown) included within storage system 12. Accordingly, in addition to being executed on storage processor 126, some or all of the instruction sets and subroutines of simulation process 10 may be executed by one or more processors (not shown) and one or more memory architectures (not shown) included within data array 112.

Further and as discussed above, during the operation of data array 112, content (e.g., content 118) to be written to data array 112 may be received from storage processor 126 and initially stored within backend cache memory system 124 prior to being stored on e.g., one or more of storage targets 102, 104, 106, 108, 110. Accordingly, during use of data array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 110 (which would typically be slower).

As discussed above, storage processor 100 and storage processor 126 may be configured in an active/active configuration where processing of data by one storage processor may be synchronized to the other storage processor. For example, data may be synchronized between each storage processor via a separate link or connection (e.g., connection 130).

Metadata Architecture:

In the context of storage systems, metadata may generally include useful internal information managed by a storage array to describe and locate user data. All modern arrays abstract the physical media and present logical (virtualized) addresses to clients in the form of LUNs. The mapping between the logical address and physical address is a form of metadata that the array needs to manage. That is typically the most common form of metadata for SAN storage systems. Newer architectures manage additional metadata to implement additional capabilities. For example, snapshots, change tracking for efficient remote replication, deduplication pointers, and compression all involve managing some form of metadata.

The classic metadata structure of traditional storage systems directly links a Logical Address of a block to the physical location of the block. In this metadata structure, every logical block written, has a physical block linked directly to it. In addition, as most traditional storage systems were architected for a spinning disk storage medium optimized for sequential writes the address of the logical address affects the physical location that the data is stored. This can lead to an unbalanced storage array that can suffer from hot-spots as specific address space ranges may experience more performance/input-output operations per second (IOPs) than other address space ranges.

Embodiments of the present disclosure may support a flash/random access medium. For example, embodiments of the present disclosure may include a metadata structure that completely decouples the Logical Block Address space address from the physical one. This is done by leveraging a multi-layer architecture.

Figure 3:
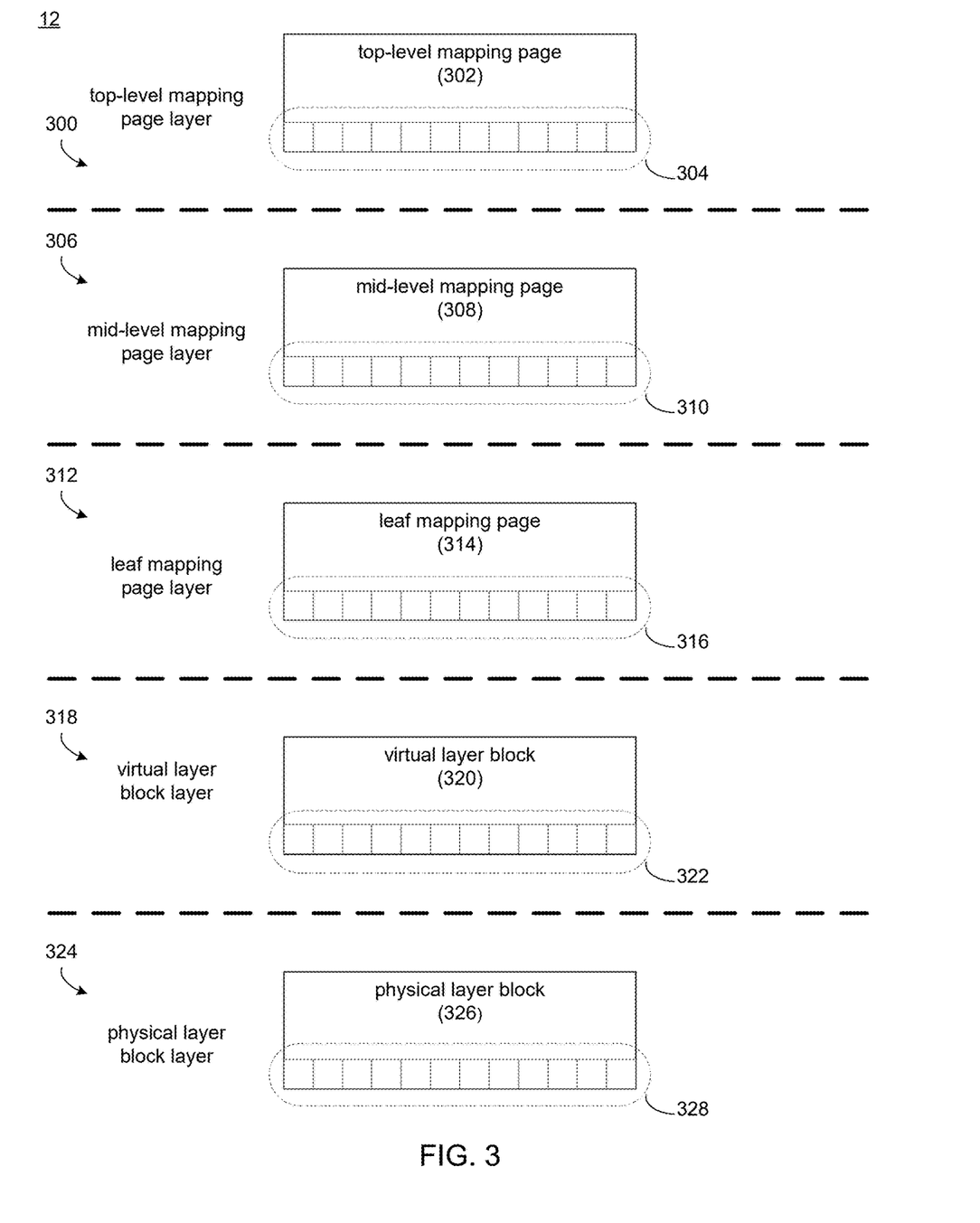

Referring also to FIG. 3, a storage system may generally include a mapper layer which is structured as a file system with various layers of pages and blocks. In some implementations, the combination of various metadata layers mapper layers may be referred to as a mapper metadata tree. While the following example includes metadata "blocks", it will be appreciated that other units of data storage may be used within the scope of the present disclosure. In some implementations, a top-level mapping page layer (e.g., top-level mapping page layer 300) may include top-level mapping page pages (e.g., top-level mapping page 302) with a plurality of entries (e.g., plurality of entries 304) that map or point to a plurality of entries of one or more mid-level mapping pages. A mid-level mapping page layer (e.g., mid-level mapping page layer 306) may include mid-level mapping page pages (e.g., mid-level mapping page 308) with a plurality of entries (e.g., plurality of entries 310) that map or point to a plurality of entries of one or more leaf mapping pages. A leaf mapping page layer (e.g., leaf mapping page layer 312) may include leaf mapping page pages (e.g., leaf mapping page 314) with a plurality of entries (e.g., plurality of entries 316) that map or point to a plurality of entries of one or more virtual layer blocks. Leaf mapping page layer 312 may represent various ranges of Logical Block Addresses (LBAs). For example, each entry of the plurality of entries (e.g., plurality of entries 316) of the leaf mapping page (e.g., leaf mapping page 314) may be associated with a LBA range. In some implementations, the combination of top-level mapping page layer 300, mid-level mapping page layer 306, and leaf mapping page layer 312 may be organized in a "tree" data structure where each leaf mapping page is a "leaf" of the "tree" data structure that corresponds to a specific LBA range. Accordingly, each leaf mapping page (e.g., leaf mapping page 314) may hold mapping of a LBA to a virtual layer block. It will be appreciated that other data structures may be used within the scope of the present disclosure to organize the first layer.

In some implementations, a virtual layer block layer (e.g., second layer 318) may include virtual layer blocks (e.g., virtual layer block 320) with a plurality of entries (e.g., plurality of entries 322) that map to a plurality of entries of one or more physical layer blocks. The virtual layer block layer (e.g., virtual layer block layer 318) may generally isolate the logical address of a block from the physical location of the block. For example, a virtual layer block (e.g., virtual layer block 308) may encapsulate the physical location of user data and allow relocation without updating leaf mapping pages (e.g., leaf mapping page 314). Accordingly, the virtual layer block layer (e.g., virtual layer block layer 318) may decouple the Logical Block Address space address from the physical one.

In some implementations, a physical block layer (e.g., physical block layer 324) may include physical layer blocks (e.g., physical layer block 326) with a plurality of entries or portions (e.g., plurality of entries 328) that are configured to store user data. In this manner, physical block layer 324 may describe the physical location of user data in a storage system. In some implementations, each physical layer block (e.g., physical layer block 326) may have a predefined amount of storage capacity for storing data (e.g., user data).

Figure 4:
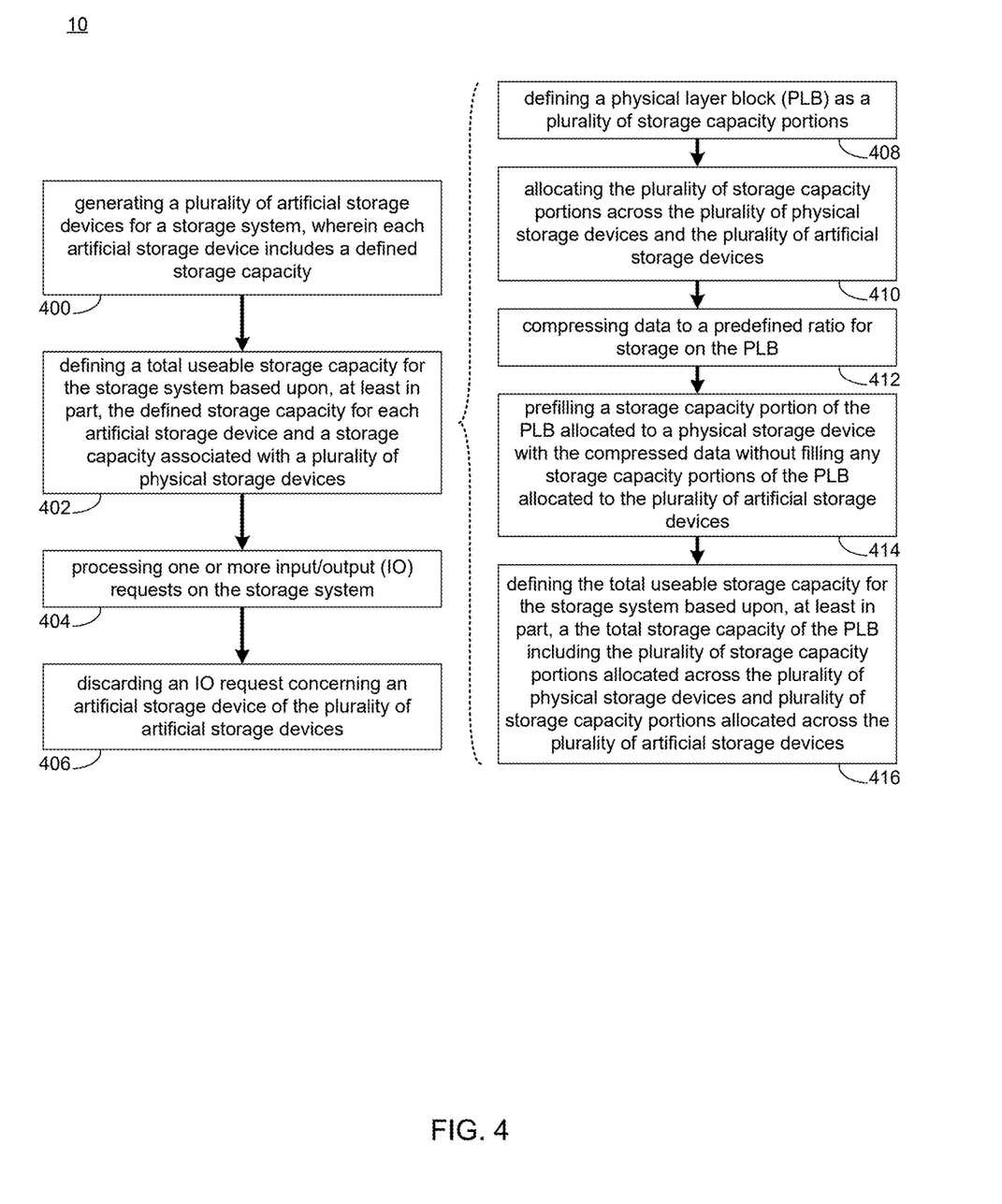
FIG. 4 is an example flowchart of the simulation process of FIG. 1 according to one or more example implementations of the disclosure.
Figure 5:
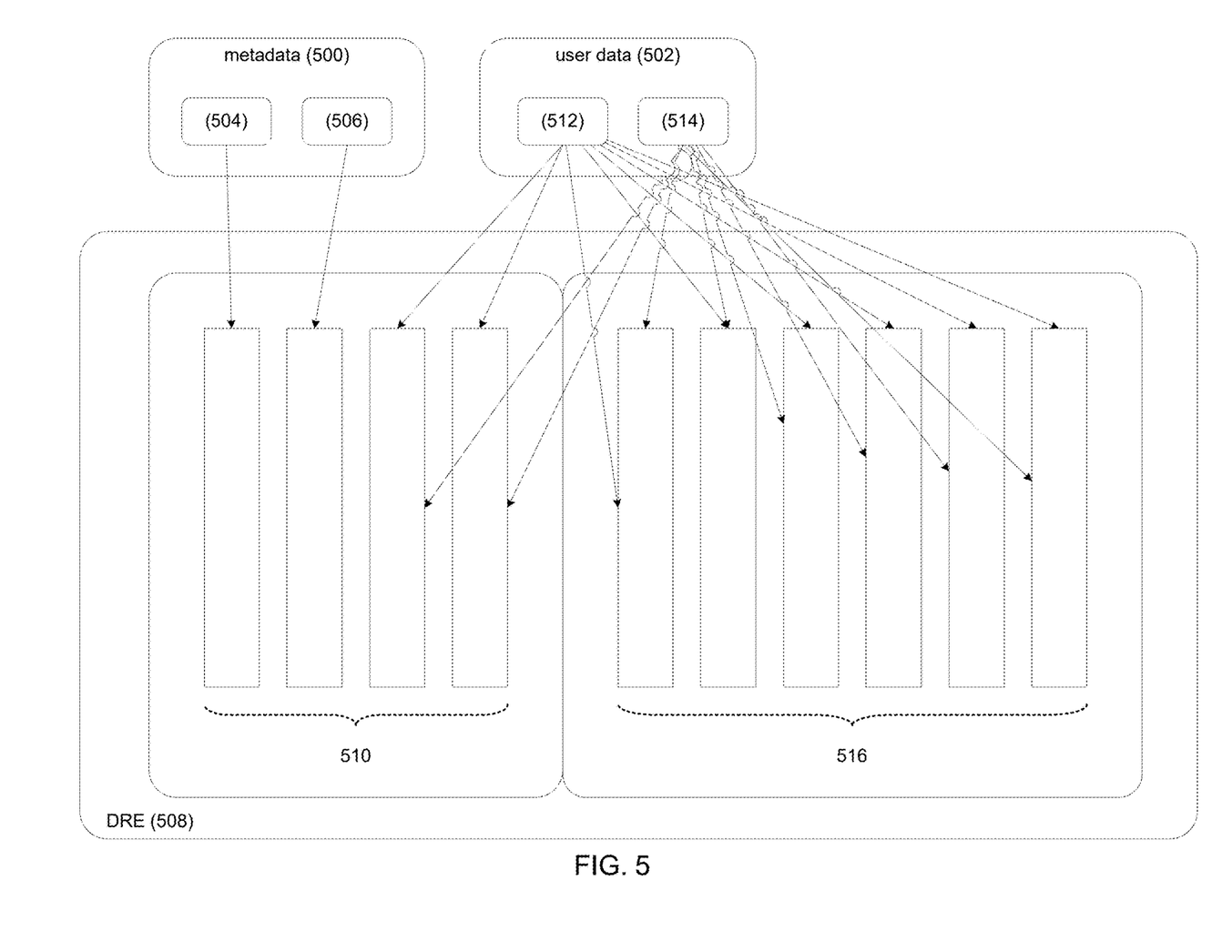
FIGS. 5-6 are example diagrammatic views of the simulation process of FIG. 1 according to one or more example implementations of the disclosure.
Figure 6:
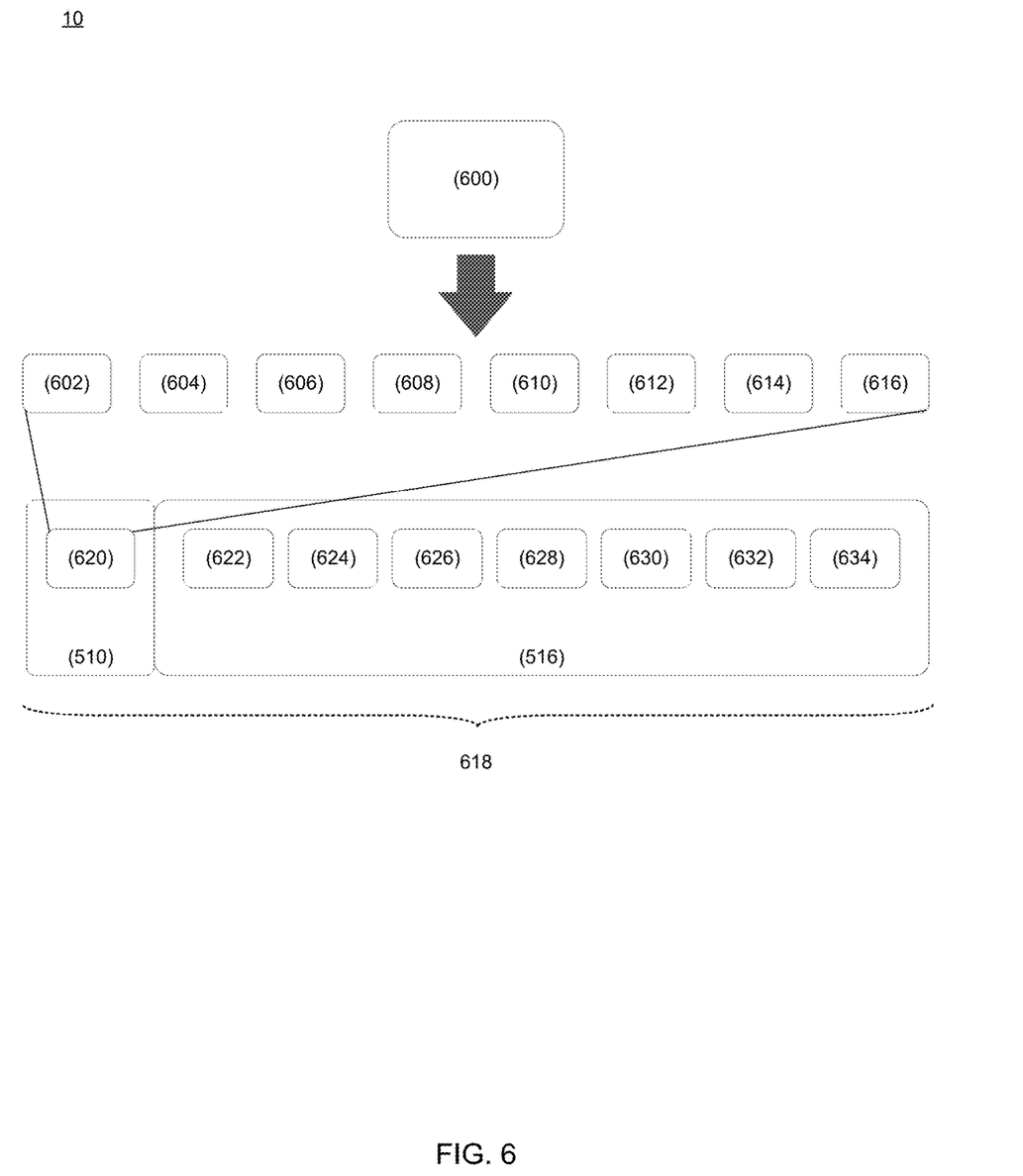

The Simulation Process:

Referring also to FIGS. 4-6 and in some implementations, simulation process 10 generates 400 a plurality of artificial storage devices for a storage system, wherein each artificial storage device includes a defined storage capacity. A total useable storage capacity for the storage system is defined 402 based upon, at least in part, the defined storage capacity for each artificial storage device and a storage capacity associated with a plurality of physical storage devices. One or more input/output (IO) requests are processed 404 on the storage system. An IO request concerning an artificial storage device of the plurality of artificial storage devices is discarded 406.

In some implementations, simulation process 10 may allow for simulations of large storage capacity storage systems with limited physical resources. For example, patterns of escalations on storage systems with large physical capacities have been observed from release to release. These issues may have been identified by conducting standard tests on large configurations during testing. Unfortunately, the lack of tests being run on larger configurations results in issues being leaked to the field.

In the storage industry, there is generally insufficient test coverage on large configurations due to significant costs. Some storage system limits depend on the total raw physical capacity of the storage system, such as the maximum number of uber objects that can be allocated and the memory budget that each component requires. Additionally, certain features are only enabled on larger configurations. However, setting up a storage system for multiple simulations with the maximum number of drives and physical capacity is costly. Furthermore, running tests on large configurations, especially tests that fill the entire system, can take a significant period of time. To address these issues, simulation process 10 simulates a large capacity on storage systems with limited storage devices. This helps save significant costs, both in terms of resources and time, while also improving test coverage on larger configurations.

In some implementations, simulation process 10 generates 400 a plurality of artificial storage devices for a storage system, wherein each artificial storage device includes a defined storage capacity. An artificial storage device is a software-based representation of storage capacity that does not include any physical or actual storage capacity. For example, various approaches exist for dynamically provisioning storage capacity from a pool of storage capacity depending on storage capacity usage or demand. In one example, these dynamic storage provisioning approaches define an initial, relative low storage capacity (e.g., 1 gigabyte) that is increased by dynamically allocating additional storage capacity as needed. However, artificial storage devices do not actually store data or have any mapping to physical storage capacity that does or may be expanded to store actual data. In this manner, an artificial storage device is represented by an identifier with an artificial storage capacity but is unable to store actual data.

In some implementations, simulation process 10 defines 402 a total useable storage capacity for the storage system based upon, at least in part, the defined storage capacity for each artificial storage device and a storage capacity associated with a plurality of physical storage devices. For example and referring also to FIG. 5, storage system 12 may be represented as processing IO requests as two types of data, metadata (e.g., metadata 500) and user data (e.g., user data 502). Metadata generally represents the data concerning the storage system's metadata architecture and is organized in various structural portions or "ubers". In one example, metadata 500 includes one or more metadata ubers (e.g., metadata uber 504) and one or more virtual layer block (VLB) ubers (e.g., VLB uber 506). As metadata uber 504 and VLB uber 506 are logical structures, simulation process 10 maps each logical structure to corresponding capacities within storage system 12. As shown in FIG. 5, storage system 12 includes a dynamic resiliency engine (DRE) (e.g., DRE 508) that partitions physical storage devices (e.g., physical storage devices 510) into a plurality of virtual portions. DRE 508 automatically consumes the storage devices within a storage system and creates appropriate redundancy using all the storage devices. This process improves overall performance and allows performance to scale as more storage devices are added to the appliance. In one example, data written to a volume can be spread across any number of storage devices within a storage system. As new storage devices are added, the data is automatically rebalanced.

As shown in FIG. 5, simulation process 10 maps metadata uber 504 and VLB uber 506 to physical storage devices 510. In addition to metadata, processing IO requests includes processing user data (e.g., user data 502). As with metadata 500, user data 502 may include one or more structural portions or "ubers". In some implementations, each uber represents a predefined amount of user data 502. In one example, user data 502 includes two user data ubers (e.g., user data ubers 512, 514). In some implementations, simulation process 10 maps (using DRE 508) user data ubers 512, 514 to one or more physical storage devices 510. As will be discussed in greater detail below, simulation process 10 uses DRE to map at least a portion of user data ubers 512, 514 to physical storage devices 510 and the remaining amount of user data ubers 512, 514 to artificial storage devices (e.g., artificial storage devices 516).

In some implementations, defining 402 the total usable storage capacity for the storage system includes defining 408 a physical layer block (PLB) as a plurality of storage capacity portions and allocating 410 the plurality of storage capacity portions across the plurality of physical storage devices and the plurality of artificial storage devices. For example and as discussed above, a physical layer block (e.g., physical layer block 326) with a plurality of entries or portions (e.g., plurality of entries 328) that are configured to store user data. In this manner, physical block layer 324 may describe the physical location of user data in a storage system. In some implementations, each physical layer block (e.g., physical layer block 326) may have a predefined amount of storage capacity for storing data (e.g., user data). In one example, each PLB includes two megabytes of total storage capacity. In some implementations, each PLB maps to eight virtual layer blocks (VLBs), and each VLB maps to 512 user data pages. For example and as discussed above, a virtual layer block layer (e.g., second layer 318) may include virtual layer blocks (e.g., virtual layer block 320) with a plurality of entries (e.g., plurality of entries 322) that map to a plurality of entries of one or more physical layer blocks. The virtual layer block layer (e.g., virtual layer block layer 318) may generally isolate the logical address of a block from the physical location of the block. For example, a virtual layer block (e.g., virtual layer block 308) may encapsulate the physical location of user data and may decouple the Logical Block Address space address from the physical one. In some implementations, defining 402 the total useable storage capacity for the storage system includes defining 408 physical layer blocks (PLBs) that map to a total useable storage capacity in terms of user data. For example, the total usable storage capacity may be defined as the sum of the total capacities of each physical storage device (e.g., physical storage device 510) and each artificial storage device (e.g., artificial storage device 516). When defining the total usable storage capacity, simulation process 10 determines the number of PLBs needed to map to the total usable storage capacity defined by the physical storage devices and the artificial storage devices. In this manner, the total usable storage capacity may also be defined in terms of PLBs that map to the one or more physical storage devices and the one or more artificial storage devices.

In some implementations, defining 402 the total useable storage capacity for the storage system includes compressing 412 data to a predefined ratio for storage on the PLB and prefilling 414 a storage capacity portion of the PLB allocated to a physical storage device with the compressed data without filling any storage capacity portions of the PLB allocated to the plurality of artificial storage devices. For example, a limits scaling test is typically utilized to assess a storage system's behavior on large configurations. To test against various object limits in the storage system, it is necessary to fill up the storage system. However, storage systems with artificial storage devices have limited actual physical capacity yet appear to have much larger usable capacity. Accordingly, simulation process 10 uses data compression to prefill the storage system with limited capacity without incurring undue production code generation.

In some implementations, a storage system may have a limit of e.g., 4,096 user data pages that can be packed into a single PLB. This is because up to eight VLBs can be linked with one PLB, and each VLB can describe as many as 512 user data pages. By utilizing this limitation and pre-filling the storage system with data compressed to a specific ratio, simulation process 10 can restrict the valid data in each PLB to a particular level. For instance, if simulation process 10 compresses data at a predefined ratio (e.g., 64:1) to fill the storage system, 4,096 user data pages of size 4 KB can be compressed into 256 KB. In some implementations, simulation process 10 determines the compression ratio to limit the number of physical storage devices required for representing a total useable storage capacity.

Referring also to FIG. 6, suppose simulation process 10 processes user data 600. In this example, suppose simulation process 10 maps user data 600 to a plurality of VLBs (e.g., VLBs, 602, 604, 606, 608, 610, 612, 614, 616). As discussed above, user data 600 includes 4,096 user data pages that can be mapped to a single PLB because each of VLBs 602, 604, 606, 608, 610, 612, 614, 616 can be mapped to a single PLB. Accordingly, simulation process 10 may map each VLB (e.g., VLBs 602, 604, 606, 608, 610, 612, 614, 616) to a plurality of storage capacity portions of PLB. For example and as shown in FIG. 6, a PLB (e.g., PLB 618) includes a plurality of storage capacity portions (e.g., storage capacity portions 620, 622, 624, 626, 628, 630, 632, 634). In some implementations, simulation process 10 determines the compression ratio such that a minimum number of storage capacity portions of PLB 618 are mapped to physical storage devices as opposed to artificial storage devices. In this example, simulation process 10 maximizes the efficiency of the total useable storage capacity for the storage system by selecting the storage capacity portion allocations such that an entire PLB can be represented in a storage capacity portion allocated to a physical storage device.

In some implementations, defining 402 the total useable storage capacity for the storage system includes defining 416 the total useable storage capacity for the storage system based upon, at least in part, a total storage capacity of the PLB including the plurality of storage capacity portions allocated across the plurality of physical storage devices and plurality of storage capacity portions allocated across the plurality of artificial storage devices. Continuing with the above example, simulation process 10 defines 416 the total useable storage capacity for the storage system using the storage capacity portions of PLB 618 that are allocated to a physical storage device and the storage capacity portions of PLB 618 that are allocated to an artificial storage device. Specifically, in this example, when allocating storage capacity portions of PLB 618, simulation process 10 allocates one storage capacity portion (e.g., the first 256 kilobytes (KB)) to a physical storage device and allocates the remaining storage capacity portions to artificial storage devices. Using this example, simulation process 10 simulates a 64 terabytes (TB) system on a storage system with just 1 TB of actual physical storage capacity.

In some implementations, simulation process 10 processes 404 one or more input/output (IO) requests on the storage system. In response to generating the plurality of artificial storage devices and defining the total useable storage capacity for the storage system, simulation process 10 processes 404 IO requests on the storage system. As discussed above, the one or more IO requests may be defined by a simulation being performed on the storage system. For example, a set of IO requests may be used to define the constraints of a simulation or test sequence performed on the storage system. Accordingly, the one or more IO requests may concern PLBs or storage capacity portions of a PLB on an artificial storage device and/or a physical storage device.

In some implementations, simulation process 10 discards 406 an IO request concerning an artificial storage device of the plurality of artificial storage devices. For example, as the artificial storage devices can only be "seen" by DRE 508, simulation process 10 discards 406 (i.e., drops or deletes) the IO requests concerning the artificial storage devices without affecting the status of the client requests.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object-oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to implementations of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general-purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various implementations of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various implementations with various modifications as are suited to the particular use contemplated.

A number of implementations have been described. Having thus described the disclosure of the present application in detail and by reference to implementations thereof, it will be apparent that modifications and variations are possible without departing from the scope of the disclosure defined in the appended claims.

What is claimed is:

1. A computer-implemented method, executed on a computing device, comprising:
generating a plurality of artificial storage devices for a storage system, wherein each artificial storage device includes a defined storage capacity;
defining a total useable storage capacity for the storage system based upon, at least in part, the defined storage capacity for each artificial storage device and a storage capacity associated with a plurality of physical storage devices, wherein defining the total useable storage capacity for the storage system includes:
defining a physical layer block (PLB) as a plurality of storage capacity portions;
allocating the plurality of storage capacity portions across the plurality of physical storage devices and the plurality of artificial storage devices;
compressing data to a predefined ratio for storage on the PLB; and
prefilling a storage capacity portion of the PLB allocated to a physical storage device with the compressed data without filling any storage capacity portions of the PLB allocated to the plurality of artificial storage devices;
processing one or more input/output (IO) requests on the storage system; and
discarding an IO request concerning an artificial storage device of the plurality of artificial storage devices.

2. The computer implemented method of claim 1, wherein the PLB includes two megabytes of total storage capacity.

3. The computer implemented method of claim 1, wherein defining the total useable storage capacity for the storage system includes defining the total useable storage capacity for the storage system based upon, at least in part, a total storage capacity of the PLB including the plurality of storage capacity portions allocated across the plurality of physical storage devices and plurality of storage capacity portions allocated across the plurality of artificial storage devices.

4. The computer implemented method of claim 1, wherein the PLB maps to eight virtual layer blocks (VLBs) and each VLB maps to 512 user data pages.

5. A computer program product residing on a non-transitory computer readable medium having a plurality of instructions stored thereon which, when executed by a processor, cause the processor to perform operations comprising:
generating a plurality of artificial storage devices for a storage system, wherein each artificial storage device includes a defined storage capacity;
defining a total useable storage capacity for the storage system based upon, at least in part, the defined storage capacity for each artificial storage device and a storage capacity associated with a plurality of physical storage devices, wherein defining the total useable storage capacity for the storage system includes:
defining a physical layer block (PLB) as a plurality of storage capacity portions;
allocating the plurality of storage capacity portions across the plurality of physical storage devices and the plurality of artificial storage devices;
compressing data to a predefined ratio for storage on the PLB; and
prefilling a storage capacity portion of the PLB allocated to a physical storage device with the compressed data without filling any storage capacity portions of the PLB allocated to the plurality of artificial storage devices;
processing one or more input/output (IO) requests on the storage system; and discarding an IO request concerning an artificial storage device of the plurality of artificial storage devices.

6. The computer program product of claim 5, wherein the PLB includes two megabytes of total storage capacity.

7. The computer program product of claim 5, wherein defining the total useable storage capacity for the storage system includes defining the total useable storage capacity for the storage system based upon, at least in part, a total storage capacity of the PLB including the plurality of storage capacity portions allocated across the plurality of physical storage devices and plurality of storage capacity portions allocated across the plurality of artificial storage devices.

8. The computer program product of claim 5, wherein the PLB maps to eight virtual layer blocks (VLBs) and each VLB maps to 512 user data pages.

9. A computing system comprising:
a memory; and
a processor configured to generate a plurality of artificial storage devices for a storage system, wherein each artificial storage device includes a defined storage capacity, to define a total useable storage capacity for the storage system based upon, at least in part, the defined storage capacity for each artificial storage device and a storage capacity associated with a plurality of physical storage devices, wherein defining the total useable storage capacity for the storage system includes: defining a physical layer block (PLB) as a plurality of storage capacity portions, allocating the plurality of storage capacity portions across the plurality of physical storage devices and the plurality of artificial storage devices, compressing data to a predefined ratio for storage on the PLB, and prefilling a storage capacity portion of the PLB allocated to a physical storage device with the compressed data without filling any storage capacity portions of the PLB allocated to the plurality of artificial storage devices, to process one or more input/output (IO) requests on the storage system, and to discard an IO request concerning an artificial storage device of the plurality of artificial storage devices.

10. The computing system of claim 9, wherein the PLB includes two megabytes of total storage capacity.

11. The computing system of claim 9, wherein defining the total useable storage capacity for the storage system includes defining the total useable storage capacity for the storage system based upon, at least in part, a total storage capacity of the PLB including the plurality of storage capacity portions allocated across the plurality of physical storage devices and plurality of storage capacity portions allocated across the plurality of artificial storage devices.

* * * * *